United States Patent [19]

Abraham

[11] Patent Number: 4,467,641

[45] Date of Patent: Aug. 28, 1984

[54] DEVICE FOR MEASURING A PARAMETER ON A ROTARY ELEMENT, AND IN PARTICULAR FOR MEASURING THE PRESSURE OF A PNEUMATIC TIRE ON A WHEEL

[75] Inventor: Michel Abraham, Elancourt, France

[73] Assignee: Precision Mechanique Labinal, France

[21] Appl. No.: 413,371

[22] PCT Filed: Dec. 22, 1981

[86] PCT No.: PCT/FR81/00167

§ 371 Date: Aug. 10, 1982

§ 102(e) Date: Aug. 10, 1982

[87] PCT Pub. No.: WO82/02249

PCT Pub. Date: Jul. 8, 1982

[30] Foreign Application Priority Data

Dec. 29, 1980 [FR] France ............................ 80 27676

[51] Int. Cl.³ ............................................ B60C 23/02
[52] U.S. Cl. ...................................... 73/146.5; 340/58
[58] Field of Search ............. 73/146.5; 340/58, 870.16

[56] References Cited

U.S. PATENT DOCUMENTS

| 2,070,743 | 2/1937 | McDonnell | 73/146.5 |
| 3,824,857 | 7/1974 | Smith | 340/870.17 |
| 4,148,008 | 4/1979 | Lusk et al. | 340/58 |
| 4,283,707 | 8/1981 | Church | 73/146.5 |
| 4,334,428 | 6/1982 | Fima et al. | 73/146.5 |

FOREIGN PATENT DOCUMENTS 2344007 10/1977 France .
2440042 5/1980 France .
2444308 5/1980 France .

Primary Examiner—Donald O. Woodiel
Attorney, Agent, or Firm—Larson and Taylor

[57] ABSTRACT

The device for measuring a parameter pertaining to a rotary element rotating about a shaft carried by a fixed structure, comprises, on the rotary element, at least one sensor (15) with an associated electric circuit and, on the structure, an electric energy generator (3), coupling means (6, 11) for transmitting electric energy from the generator (3) to the sensor (15) and, in return, the signals from the sensor (15) to utilization means (8, 9). The generator (3) produces electric power at a frequency lower than 100 kHz and the circuit associated with the sensor (13, 14, 16, 17, 18, 19, 20) generates a signal of high frequency which varies within a wide band between 20 and 100 kHz, the coupling being achieved by a transformer (6, 11) in the form of a rotating machine whose structure allows the passage of a wide pass band at least between the frequency of the generator and 100 kHz. This device is in particular applicable to the measurement of the pressure of pneumatic tires of aircraft undercarriages.

12 Claims, 3 Drawing Figures

DEVICE FOR MEASURING A PARAMETER ON A ROTARY ELEMENT, AND IN PARTICULAR FOR MEASURING THE PRESSURE OF A PNEUMATIC TIRE ON A WHEEL

The present invention relates to a device for measuring a parameter, such as for example a pressure, pertaining to a rotary element such as for example a wheel, said device being applicable in particular to the measuring of the internal pressure of a pneumatic tire on a wheel, for example an aircraft undercarriage wheel.

Several devices have already been proposed for giving an indication of the value of a parameter pertaining to a rotary element or a wheel. This parameter may be in particular the pressure in a pneumatic tire mounted on a wheel.

Most of the devices can only provide an indication limited to a definite value of the parameter which closes or opens an electric contact, the reading of the corresponding information being effected upon each rotation of the wheel when there is an angular coincidence between the element carried by the wheel and a corresponding fixed element. Apart from the fact that they are incapable of effecting a measurement within wide range of values, these devices are limited in their utilization, since when the rotary element stops in a random position, they are unable to effect the measurement or ensure the transmission of a measurement which had been effected.

It has also been proposed to mount on a wheel carrying a pneumatic tire, a radio or ultrasonic transmitter which is capable of transmitting information to a receiver mounted on a fixed part. Such devices may possibly operate even when the rotary element stops in a random position. They are of limited use, since the source of energy required for the transmission is necessarily weak so that these devices are solely used as means for giving a warning of deflation of pneumatic tires. Further, the use of ultrasonic or hertzian waves can hardly be envisaged in applications such as aircraft undercarriages owing to the severe conditions of the environment and possible hertzian and ultrasonic interferences.

It has also already been proposed to provide a device which transmits electric energy at a first frequency between a fixed element and a rotary element through a transformer whose primary and secondary windings are rotatable with respect to each other, this transformer transmitting in the opposite direction an electric signal of distinctly higher fixed frequency generated in the rotating part and transmitted to the fixed part. However, such a device is incapable of providing in a simple manner the result of a measurement which would be effected in the rotating part and consequently cannot be used in a simple and precise manner.

There has also been proposed a device for measuring pressure in a pneumatic tire of an aircraft wheel in which an electric generator delivers to a measuring circuit installed in the wheel itself, through coupling means, high-frequency electric energy, the device transmitting in the opposite direction a measurement signal within the low-frequency range. Such a device is relatively easy to construct but its performances are necessarily limited owing to the transfer of the results of the measurement at low frequency.

An object of the present invention is to overcome these drawbacks and to provide a device for measuring a parameter pertaining to a rotary element which permits the obtainment in a continuous or substantially continuous manner the value of the measurement irrespective of the angular position of the rotary element while it rotates or while it is stationary.

Another object of the invention is to provide such a device which is capable of providing, with a high degree of reliability, measurement indications which are extremely precise over a wide range of variation of the parameter.

Another object of the invention is to provide such a device which is simple in construction and permits precise measurements to be effected.

Still another object of the invention is to provide such a device which is in particular adapted to effect measurements in respect of rotary elements such as aircraft wheels and operating in a particularly difficult environment.

A further object of the invention is to provide such a device which is applicable in particular to the measurement of the pressure in pneumatic tires of wheels, and in particular aircraft wheels, which has a very high reliability with a particularly low, and even no, risk of breakdowns or false indications.

According to the invention, there is provided a device for measuring a parameter pertaining to a rotary element, and in particular a parameter such as the pressure in a pneumatic tire of a wheel, and in particular an aircraft wheel, said rotary element rotating about a shaft carried by a fixed structure, the rotary element carrying at least one sensor with an associated electric circuit, and a structure carrying an electric energy generator for supplying power to said circuit, and utilization means responsive to a signal generated in said circuit, coupling means permitting the transmission of said electric energy from the generator to the sensor circuit and said signal of the sensor circuit to said utilization means, wherein said generator transmits an electric power at a frequency lower than 10 kHz and preferably lower than 5 kHz, said circuit associated with the sensor generates a signal of frequency which varies within a wide band between 20 and 100 kHz and the coupling between the rotary element and the shaft is ensured by a transformer in the form of a rotating machine whose fixed primary winding is rigid with the shaft and whose rotary secondary winding is rigid with the wheel and whose structure allows the passage of a wide pass band between the frequency of the generator and 100 kHz.

According to a particularly advantageous feature of the invention, the electric circuit associated with the sensor has a voltage/frequency converter which converts a voltage constituting the signal delivered by the sensor to a frequency which is a function of said voltage.

According to another advantageous feature of the invention, the utilization means responsive to the high-frequency signal comprise a band-pass filter of 20 to 100 kHz.

Preferably, the electric energy generator delivers electric energy at a fixed low frequency between 2000 and 5000 Hz.

The electric circuit associated with the sensor has means connected to the secondary winding of the transformer for the purpose of supplying power to the other components of the circuit at a stabilized regulated voltage. The circuit further comprises a voltage/frequency converter, followed by filtering and linearization means for the signal which convert the high-frequency square signal of the converter into a sinusoidal signal of the same frequency which is supplied to the secondary winding of the transformer, for example by means of a capacitive coupling.

There is then found on the primary winding of the transformer a carrier wave having the frequency of the generator superimposed on a wave whose frequency varies within a wide range between 20 and 100 kHz.

The band-pass filter is advantageously preceded by a circuit rejecting the low frequency while the generator, owing to the very high frequency of the signal from the secondary winding to the primary winding, may be protected by a simple choke coil in the same way as the stabilized supply means.

The transformer may be advantageously constructed in the form of a rotating machine having multipole stator and rotor, for example having 24 poles. Other transformers may also be employed, for example of the type having coaxial primary and secondary windings.

In the application of the device according to the invention to the measurement of the pressure of pneumatic tires in an aircraft undercarriage, the sensor is advantageously formed by a stress gauge, for example a stress gauge bridge diffused on a monocrystal silicon substrate. The stress gauge is placed in such manner that it is suitably deformed by the pressure prevailing in the pneumatic tire, the bridge delivering a voltage which varies in a continuous manner as a function of the deformation.

In such an application, the device provides advantageously for each wheel such a pressure sensor, each wheel having a transformer, the primary windings of the different transformers being connected, preferably by screened twisted pairs of conductors, to a multiplexing device receiving the output conductors of the electric generator and leading by way of a suitable output to a logic processing unit which utilizes the different pressure measurements supplied thereto in the form of a wide-band high-frequency signal. Preferably, the logic processing unit controls the multiplexing means in such manner as to effect the various measurements on the various wheels in a separate and successive manner.

Further features and advantages of the invention will be apparent from the ensuing description which is given solely by way of example with reference to the accompanying drawing in which.

Figure 1:
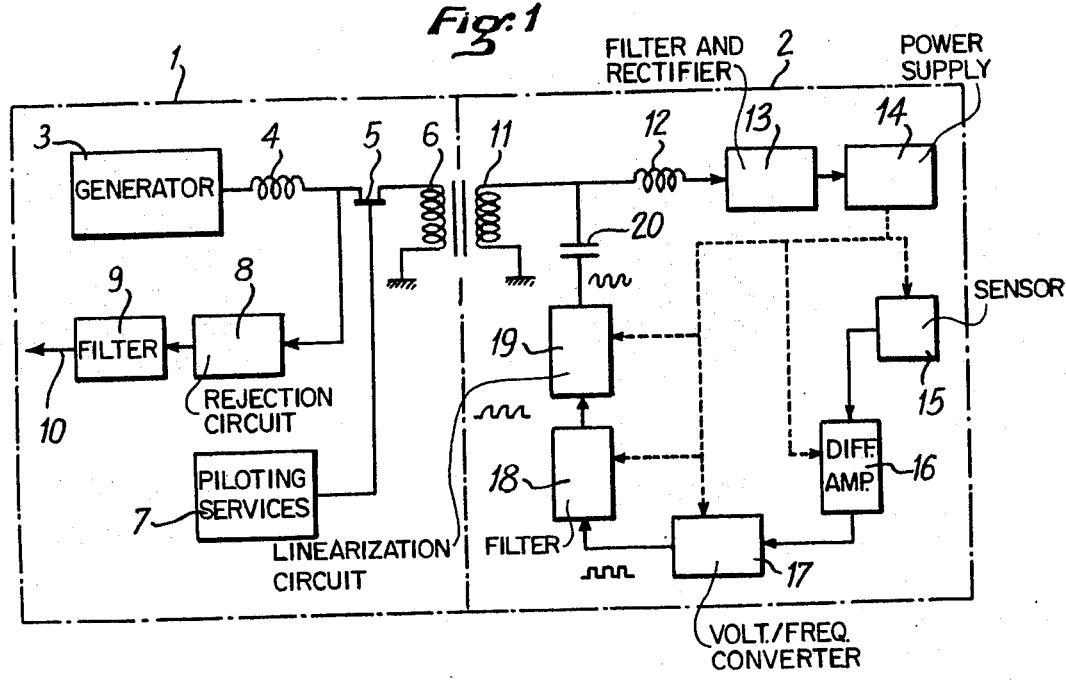
FIG. 1 shows diagrammatically the device according to the invention employed for a single rotary element.

Reference will first be made to FIG. 1 which shows diagrammatically a device for measuring the pressure in a single pneumatic tire of an undercarriage, merely for the purpose of simplifying the description.

The illustrated device comprises a fixed part 1 and a moving part 2 carried by the wheel, each part being represented within a dot-dash contour. The fixed part 1 comprises a generator 3 for delivering electric energy at a frequency of 3200 Hz. This electric energy easily passes through a choke coil 4 and switching means 5 such as a MOS-FET power transistor and supplies power to the primary winding 6 of a transformer formed by a rotating machine having a stator, which is here the primary winding 6 having 24 poles, and a rotor 11 having 24 corresponding poles. A piloting device 7 permits acting on the switching means 5 so as to allow or not allow the supply of power to the primary winding 6 by the generator 3. A branch line located between the element 5 and the choke 4 leads to a rejection circuit 8 which prevents the passage of the frequency of 3200 kHz but allows the passage of higher frequencies. This circuit 8 is connected to a band-pass filter 9 of 20 to 100 kHz. The output 10 of the band-pass filter 9 may be connected to a device utilizing the result, such as a calculator.

The part 2, which is mounted on the wheel, comprises the secondary winding 11, i.e. the rotor of the transformer. In this respect, it must be understood that the stator 6 is carried on the stub-axle of the wheel while the rotor 11 is carried by the wheel itself, co-axially with the stub-axle and the stator 6.

The secondary output 11 is connected to a choke coil 12 and, through the latter, to a filtering and rectifying unit 13 which provides the electric power for a regulated supply circuit 14. This circuit is capable, when it receives the power from the generator 3, of delivering a stabilized low voltage.

Also disposed in the rotating part 2 is the pressure sensor 15 which is sensitive to the pressure prevailing in the pneumatic tire of the wheel. This sensor 15, to which may be advantageously associated a compensation circuit in particular for the temperature variations, of a conventional type, delivers, in response to the value of the pressure it detects, a voltage which is a function of this pressure and is delivered to a differential amplifier 16. The output of the amplifier 16 is connected to a voltage/frequency converter 17 which delivers a square signal of a frequency which is a function of the voltage it receives, for example a frequency proportional to this voltage. The output of the converter 17 is connected to a conventional filtering means 18, followed by a linearization circuit for the signal 19 so that it is possible to obtain a substantially sinusoidal signal whose frequency is a function of the output voltage of the pressure sensor 15. This sinusoidal signal, whose frequency is between 20 and 100 kHz, is then injected through an injection capacitor 20 into the secondary winding 11 of the transformer. The choke coil 12 prevents this high-frequency signal from reaching the circuits 13 and 14.

The stabilized supply circuit 14 delivers, as can be seen by the dot-dash lines, a stabilized voltage of 10.5 volts to each of the elements 15, 16, 17, 18 and 19 so as to operate these elements.

The high-frequency sinusoidal signal injected into the secondary winding 11 is found at the terminals of the primary winding 6 and, in passing through the switching means 5, it reaches the rejection circuit 8 which allows it to reach the band-pass filter 9 so that the high-frequency signal between 20 and 100 kHz is available on the output 10, there having been removed therefrom the low-frequency wave and all the parasitic or harmonic signals which may have been induced. The signal can now be utilized, for example by a calculator.

Figure 2:
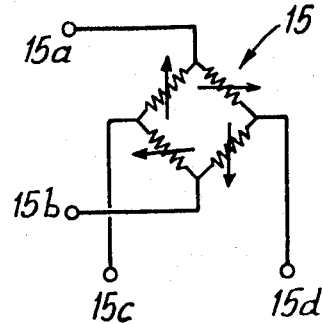
FIG. 2 shows diagrammatically the circuit formed by a stress gauge bridge.

With reference to FIG. 2, it can be seen that the pressure sensor 15 is arranged as a stress gauge bridge diffused on a monocrystal substrate whose resistances vary as a function of the pressure. The terminals 15a, 15b receive the stabilized supply voltage of 10.5 volts and the signal of the sensor, responsive to the pressure, is available at the terminals 15c, 15d.

Figure 3:
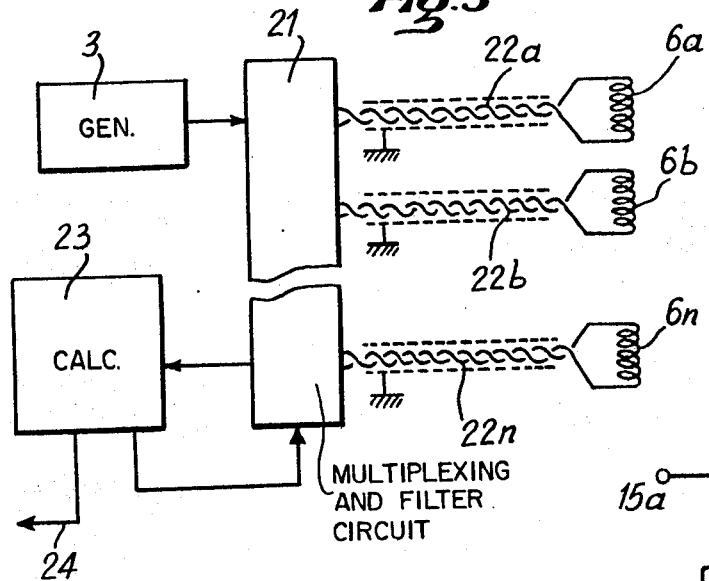
FIG. 3 shows diagrammatically the fixed part of the circuit in the application to the measurement of the pressure of pneumatic tires of an undercarriage.

With reference to FIG. 3, there can be seen diagrammatically the fixed part of a device for measuring the pressure in an undercarriage of an aircraft of large size. There is shown the generator 3 which delivers its low-frequency sinusoidal signal to a multiplexing and filtering unit 21 from which extend a plurality of twisted pairs of conductors of 22a, 22b, . . . 22n which respectively lead to the primary windings 6a, 6b, . . . 6n respectively mounted on the stub-axles of n wheels. The twisted pairs of conductors are protected by a screen diagrammatically shown and earthed. A logic processing calculator 23 controls the multiplexing and filtering unit 21 from which it receives the measurement signals which it processes and delivers through an output 24 to display means (not shown) on the control panel of the apparatus.

Thus it must be understood that the multiplexing and filtering unit 21 comprises switching means which replace the switching means 5 and rejection and band-pass filtering means which replace the means 8 and 9.

Further, it will be understood that there is associated with each transformer primary winding 6a, 6b, . . . 6n a secondary winding on the corresponding wheel, each secondary winding being connected, on the respective wheel, to a wheel circuit similar to the circuit 2.

The device operates in the following manner:

The low-frequency alternating signal between 2000 and 5000 Hz is generated in a constant manner by the generator 3. The calculator 23 switches the output of the generator successively to the different primary windings 6a, 6b, . . . 6n during a first period, for example of a few tens of milliseconds, the first half of this period serving to establish a continuous operation. During this period, the elements 17, 18, 19 do not reinject a signal, or, by way of a modification, the multiplexing and filtering device 21 does not allow the passage of such a signal. As soon as the continuous operation is established after the first half of the period, the high-frequency sinusoidal signal between 20 and 100 kHz is injected into the secondary winding and thence reaches the primary winding of the corresponding wheel and then the multiplexing and filtering unit 21 which sends it to the calculator 23. Following on this second semi-period, the calculator 23 then switches to the following wheel. The duration of the utilization by the calculator 23 may be of the order of the semi-period, or extend over a longer duration owing to the fact that the calculator can operate during the semi-periods corresponding to the establishment of the continuous operation during which the calculator does not receive a measurement signal.

Preferably, the calculator 23 is so programmed that, when it detects a pressure which is incorrect either in its absolute value or its differential value relative to the pressure of another wheel of the undercarriage, it waits until it has measured three times running the same abnormal value so as to deliver an alarm signal. Further, the electronic components are arranged, in the conventional manner, so that the very large majority of the possible breakdowns produce a warning termed "system alarm" and not an accidental "pressure alarm". In particular, any breakage of a supply conductor produces a "system alarm".

It is indeed essential to avoid causing a sudden stoppage of the take-off procedure.

Although the invention has been described in respect of a particular embodiment, it must be understood that the scope of the invention is in no way intended to be limited thereto and that various modifications may be made therein without departing from the scope or the spirit of the invention.

I claim:

1. A device for measuring a parameter pertaining to a rotary element rotating about a shaft carried by a fixed structure, the rotary element carrying at least one sensor for said parameter with an associated electric circuit and the structure carrying, on one hand, an electric energy generator for supplying power to said circuit and, on the other hand, utilization means which are responsive to a signal generated in said circuit, coupling means permitting the transmission of said electric energy of the generator to the sensor circuit and said signal from the sensor circuit to said utilization means, characterized in that said generator generates an electric power at a frequency lower than 10 kHz, said circuit associated with the sensor generates a signal of a high frequency which varies within a wide band between 20 and 100 kHz, and the coupling between the rotary element and the shaft carried by the structure is ensured by a transformer in the form of a rotating machine whose fixed primary winding is rigid with the shaft and whose rotary secondary winding is rigid with the rotary element, and whose structure allows the passage of a wide passband at least between the frequency of the generator and 100 kHz.

2. A device according to claim 1, wherein said generator provides an electric power at a frequency between 2 and 5 kHz.

3. A device according to claim 1 or claim 2, wherein the electric circuit associated with the sensor comprises a voltage/frequency converter which converts a variable voltage constituting the signal delivered by the sensor into a frequency which is a function of said voltage.

4. A device according to claim 3, wherein said voltage/frequency converter is followed by filtering means and linearization means of the signal which permit the conversion of a high-frequency square signal issuing from said converter into a sinusoidal signal of the same frequency.

5. A device according to claim 1 or claim 2, comprising a capacitive coupling between said circuit associated with the sensor and the secondary winding of the transformer for injecting the measurement signal into said secondary winding.

6. A device according to claim 3, wherein said circuit associated with the sensor comprises rectifying and filtering means and a stabilized regulated supply circuit supplying power to the other elements of said circuit associated with the sensor.

7. A device according to claim 6, wherein said rectifying and filtering means and said stabilized supply circuit are protected from the high-frequency signal by a choke coil.

8. A device according to claim 1 or claim 2, wherein said utilization means comprise a band-pass filter of 20 to 100 kHz.

9. A device according to claim 8, wherein said band-pass filter is preceded by a rejector.

10. A device according to claim 1 or claim 2, comprising a plurality of transformers whose primary windings are respectively connected to a multiplexing and filtering unit receiving electric energy from said generator, said unit being controlled by a calculator which receives the measurement signals coming from said unit.

11. A device according to claim 10, wherein the calculator causes separately and in succession the sending of the electric energy from the generator to the primary winding of each one of the transformers, and the sending of the signals coming from the corresponding secondary winding to the calculator through the unit.

12. A device according to claim 11, applied to the measurement of pressure in a pneumatic tire, said device comprising in the region of the tire at least one pressure sensor, in particular in the form of a stress gauge bridge.

* * * * *

UNITED STATES PATENT AND TRADEMARK OFFICE
CERTIFICATE OF CORRECTION

PATENT NO. : 4,467,641

DATED : August 28, 1984

INVENTOR(S) : ABRAHAM, Michel

It is certified that error appears in the above—identified patent and that said Letters Patent is hereby corrected as shown below:

Title page:

Please change the assignee from "PRECISION MECHANIQUE LABINAL to read -- Precision Mecanique Labinal --.

Signed and Sealed this

Twenty-fourth Day of February, 1987

Attest:

DONALD J. QUIGG

Attesting Officer

Commissioner of Patents and Trademarks